(12) United States Patent
Banach et al.

(10) Patent No.: US 6,232,429 B1
(45) Date of Patent: May 15, 2001

(54) METHOD FOR MAKING POLYESTER CARBONATES

(75) Inventors: Timothy Edward Banach, Scotia; Gary Charles Davis, Albany; Bill Kengliem Lui, Gloversville, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/431,278

(22) Filed: Nov. 1, 1999

(51) Int. Cl.$^7$ .................................................. C08G 63/02
(52) U.S. Cl. ........................ 528/176; 528/271; 528/272
(58) Field of Search ................................ 528/176, 271, 528/272

(56) References Cited

U.S. PATENT DOCUMENTS

| | | | |
|---|---|---|---|
| 3,030,331 | 4/1962 | Goldberg | 528/176 |
| 3,169,121 | 2/1965 | Goldberg | 528/176 |
| 3,207,814 | 9/1965 | Goldberg | 528/196 |
| 4,194,038 | 3/1980 | Baker et al. | 528/176 |
| 4,217,438 | 8/1980 | Brunelle et al. | 528/202 |
| 4,238,596 | 12/1980 | Quinn | 528/202 |
| 4,238,597 | 12/1980 | Markezich et al. | 528/179 |
| 4,487,896 | 12/1984 | Mark et al. | 525/439 |
| 4,506,065 | 3/1985 | Miller et al. | 528/194 |
| 4,983,706 | 1/1991 | Fontana et al. | 528/176 |
| 5,606,007 | 2/1997 | Sakashita et al. | 528/176 |

FOREIGN PATENT DOCUMENTS 4345616   5/1991   (JP).

*Primary Examiner*—Terressa M. Boykin
(74) *Attorney, Agent, or Firm*—Bernadette M. Bennett.; Noreen C. Johnson

(57) ABSTRACT

A melt condensation polymerization process for preparing polyester carbonate is provided which comprises the reaction of an aromatic dihydroxy compound, carbonic acid diester and catalyst with a diacid.

31 Claims, No Drawings

METHOD FOR MAKING POLYESTER CARBONATES

BACKGROUND OF THE INVENTION

The present invention relates to a method for making polyester carbonates. More particularly, the present invention relates to a melt condensation polymerization method involving the reaction of an aromatic dihydroxy compound, carbonic acid diester, and catalyst with a diacid.

Polyester carbonates and methods for their preparation have been studied extensively throughout the years. Polyester carbonates are thermoplastic resins that are clear and have high impact resistance. Due to their optical clarity and physical properties, polyester carbonates are used extensively in injection molding applications. The synthetic methods commonly used to made polyester carbonates are interfacial polymerization and melt condensation polymerization.

Interfacial polymerization is a well-known process. Fontana et al., U.S. Pat. No. 4,983,706, discuss the reaction of an aromatic dihydroxy compound such as bisphenol-A with phosgene and a diacid. The diacid is incorporated into the reaction mixture to produce a polyester carbonate melt flow such that the polyester carbonate is suitable for purposes of injection molding. Melt flow can also be described in terms of viscosity. Although the polyester carbonate produced by the interfacial method provides excellent viscosity for injection molding purposes, particulate contamination is often a problem. Additionally, the interfacial method uses a hazardous chemical, phosgene, and an environmentally hazardous chlorinated solvent.

Melt condensation polymerization is a known synthetic process which often results in less particulates found in the polymer compared to the interfacial method. Although melt condensation polymerization does not involve hazardous chemicals, the polyester carbonates made by the melt condensation polymerization process often do not have the flow properties of polyester carbonate made by the interfacial method.

In order to improve the flow properties of polyester carbonates made by the melt condensation polymerization process, different methods have been studied. Sakashita et al. (Japanese Patent No. Hei 4[1992]-345616) discuss amethod for preparing polyester carbonates which incorporates aliphatic diacids directly into the polyester carbonate using a melt polymerization process. Sakashita et al. are concerned with polyester carbonates which incorporate the aromatic dihydroxy compound, 2,2,2',2'-tetrahydro-3,3,3',3'-tetramethyl- 1,1'-spirobi[1H-indene]-6,6'-diol, commonly known as SBI. In particular, Sakashita et al. are concerned with producing a polyester carbonate with a glass transition temperature greater than 100° C. In addition, this method involves the use of a cocatalyst, boric acid, to facilitate the incorporation of aliphatic diacids directly into polycarbonate via a melt process.

In co-pending U.S. application, Ser. No. 09/431,277, a method is described which involves the pre-reaction of a diacid, carbonic acid diester and catalyst wherein a diester is formed. An aromatic dihydroxy compound is then added to the pre-reaction mixture in order to form a polyester carbonate. Said application discusses a method which involves the presence of a pre-reactor to initially convert the diacid and carbonic acid diester into a new diester for subsequent conversion into a polyester carbonate. The addition of a diacid successfully improves the flow properties of the polyester carbonate formed, yet requires the presence of a pre-reactor in the melt condensation polymerization process. An efficient method which does not require the pre-reaction of the diacid with carbonic acid diester has yet to be developed.

BRIEF SUMMARY OF THE INVENTION

The present invention provides a melt condensation polymerization process for preparing polyester carbonates comprising the reaction of at least one aromatic dihydroxy compound, a carbonic acid diester and a catalyst with a diacid.

In one embodiment, the present invention provides a melt condensation polymerization process for preparing a polyester carbonate comprising the direct reaction of a diacid with a carbonic acid diester and a catalyst in the presence of at least one aromatic dihydroxy compound.

In a second embodiment, the present invention provides a melt condensation polymerization process for preparing a polyester carbonate comprising the direct reaction of a diacid with a carbonic acid diester and a catalyst in the presence of polycarbonate oligomers.

DETAILED DESCRIPTION OF THE INVENTION

The present invention relates to a melt condensation polymerization process for preparing a polyester carbonate which involves the reaction between at least one aromatic dihydroxy compound, a carbonic acid diester, a catalyst and a diacid. In one embodiment of the invention, the direct reaction of a diacid with the carbonic acid diester and the catalyst occurs in the presence of at least one aromatic dihydroxy compound. In a second embodiment, at least one aromatic dihydroxy compound is reacted with a carbonic acid diester and a catalyst to form a polycarbonate oligomer. The direct reaction of a diacid with the carbonic acid diester and the catalyst then occurs in the presence of the polycarbonate oligomer.

The composition of the present invention comprises a polyester carbonate comprising structural units of formula I:

(I)

wherein D is a divalent aromatic radical; and repeating or recurring units of the formula II:

(II)

wherein D has the meaning previously ascribed to it and $R^1$ is at least one divalent moiety selected from those of the formulae III, IV and V:

(III)

-continued

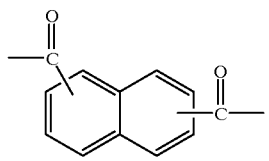

(IV)

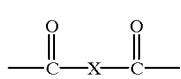

(V)

wherein X is a linear aliphatic group, branched aliphatic group, or cyclic aliphatic group. Linear and branched aliphatic groups are preferably those containing from 2 to about 20 carbon atoms, and include as illustrative non-limiting examples ethyl, propyl, isopropyl, butyl, tertiary-butyl, pentyl, neopentyl, hexyl, octyl, decyl, dodecyl. Cyclic aliphatic groups include cyclo- or bicycloalkyl radicals, preferably those containing from 3 to about 12 ring carbon atoms with a total number of carbon atoms less than or equal to 50. Some illustrative non-limiting examples of these cyclic aliphatic groups include cyclobutyl, cyclopentyl, cyclohexyl, methylcyclohexyl, and cycloheptyl. Aliphatic groups also include aralkyl radicals containing from 7 to about 14 carbon atoms; these include, but are not limited to, benzyl, phenylbutyl, phenylpropyl, and phenylethyl.

The polyester carbonates which find use in the instant invention are well known in the art as disclosed in, for example, U.S. Pat. Nos. 3,030,331; 3,169,121; 3,207,814; 4,238,596; 4,238,597; 4,487,896; 4,506,065, and in copending application Ser. No. 09/181,902, filed Oct. 29, 1998, and assigned to the same assignee as the instant application.

Suitable aromatic dihydroxy compounds for preparing polyester carbonates include those represented by the formula VI:

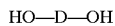

(VI)

wherein D is a divalent aromatic radical defined in formula I. Preferably, D has the structure of formula VII;

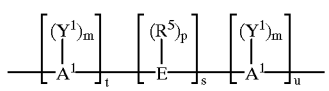

(VII)

wherein $A^1$ represents an aromatic group such as phenylene, biphenylene, and naphthylene. E may be an alkylene or alkylidene group such as methylene, ethylene, ethylidene, propylene, propylidene, isopropylidene, butylene, butylidene, isobutylidene, amylene, amylidene, and isoamylidene. When E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage such as silane or siloxy; or a sulfur-containing linkage such as sulfide, sulfoxide, or sulfone; or a phosphorus-containing linkage such as phosphinyl or phosphonyl. In addition, E may be a cycloaliphatic group, such as cyclopentylidene, cyclohexylidene, 3,3, 5-trimethylcyclohexylidene, methylcyclo-hexylidene, 2-[2.2.1]-bicycloheptylidene, neopentylidene, cyclopentadecylidene, cyclododecylidene, and adamantylidene. $R^5$ represents hydrogen or a monovalent hydrocarbon group such as alkyl radicals, aryl radicals, aralkyl radicals, alkaryl radicals, cycloalkyl radicals, or bicycloalkyl radicals. The term "alkyl radical" is intended to designate both normal alkyl and branched alkyl radicals. Normal and branched alkyl radicals are preferably those containing from 2 to about 20 carbon atoms, and include as illustrative non-limiting examples ethyl, propyl, isopropyl, butyl, tertiary-butyl, pentyl, neopentyl, hexyl, octyl, decyl, dodecyl. Aryl radicals include examples such as phenyl and tolyl. Cyclo- or bicycloalkyl radicals represented are preferably those containing from 3 to about 12 ring carbon atoms with a total carbon atoms less than or equal to 50. Some illustrative non-limiting examples of cycloalkyl radicals include cyclobutyl, cyclopentyl, cyclohexyl, methylcyclohexyl, and cycloheptyl. Preferred aralkyl radicals are those containing from 7 to about 14 carbon atoms; these include, but are not limited to, benzyl, phenylbutyl, phenylpropyl, and phenylethyl.

$Y^1$ may be a halogen, such as fluorine, bromine, chlorine, and iodine; a tertiary nitrogen group such as dimethylamino; an organic group such as $R^5$ above, or an alkoxy group such as OR wherein R is an alkyl or aryl group; it being only necessary that $Y^1$ be inert to and unaffected by the reactants and reaction conditions used to prepare the polyester carbonate. The letter "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

In the aromatic dihydroxy phenol compound in which D is represented by formula VII above, when more than one Y substituent is present, they may be the same or different. For example, the $Y^1$ substituent may be a combination of different halogens. The $R^5$ substituent may also be the same or different if more than one $R^5$ substituent is present. Where "s" is zero in formula VII and "u" is not zero, the aromatic rings are directly joined with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups.

Some illustrative, non-limiting examples of aromatic dihydroxy compounds of formula VI include the dihydroxy-substituted aromatic hydrocarbons disclosed by genus or species in U.S. Pat. No. 4,217,438. Some preferred examples of aromatic dihydroxy compounds include 4,4'-(3,3,5-trimethylcyclohexylidene)diphenol; 2,2-bis(4-hydroxyphenyl)propane (commonly known as bisphenol A); 2,2-bis(4-hydroxy-3,5-dimethylphenyl)propane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)propane; bis(4-hydroxyphenyl) cyclohexylmethane; 2,2-bis(4-hydroxyphenyl)- 1 -phenylpropane; 2,2-bis(4-hydroxy-3-methylphenyl) propane (commonly known as DMBPC); resorcinol; and $C_{1-3}$ alkyl-substituted resorcinols.

The compound, 2,2,2',2'-tetrahydro-3,3,3',3'-tetramethyl-1,1'-spirobi[1H-indene]-6,6'-diol (SBI), is not included in the aromatic dihydroxy compounds used in the present invention. Most typically, 2,2-bis(4-hydroxyphenyl)propane is the preferred aromatic dihydroxy compound used. Combinations of aromatic dihydroxy compounds can also be used to form polyester carbonates.

The direct reaction of a diacid with a carbonic acid diester and a catalyst produces a diester compound and is referred to as an esterification process. The reaction conditions may be modified to promote substantially complete conversion of the diacid and carbonic acid diester to a diester compound. "Substantially complete conversion" as used herein refers to the reaction of a diacid and carbonic acid diester wherein at least 95% of the diacid and carbonic acid diester react to form a diester compound. In order to monitor complete conversion of the diacid, proton nuclear magnetic resonance spectroscopy may be used to confirm the formation of the diester compound.

Diacids are of the general formula: $R^3(COOH)_2$ wherein $R^3$ is an alkyl or aryl group. Examples of diacids include, but are not limited to, aliphatic diacids, aromatic diacids, or combinations thereof. Examples of aliphatic diacids are adipic acid, sebacic acid, dodecanedioic acid, C-19 diacid, C-36 dimer diacid; and aromatic diacids such as isophthalic acid, terephthalic acid and 2,6-napthalenedicarboxylic acid.

Typical catalysts employed in the melt condensation polymerization process include, but are not limited to, alkali metal compounds, alkaline earth metal compounds, quaternary ammonium compounds and combinations thereof.

Useful alkali metal compounds as catalysts include, sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenolate, sodium benzoate, potassium benzoate, lithium benzoate, disodium hydrogenphosphate, dipotassium hydrogenphosphate, dilithium hydrogenphosphate, disodium, dipotassium and dilithium salts of biphenol A and sodium, potassium, and lithium salts of phenol.

Useful alkaline earth metal compounds as catalysts include calcium hydroxide, barium hydroxide, magnesium hydroxide, strontium hydroxide, calcium hydrogen carbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

Useful quaternary ammonium compounds as catalysts include tetraalkylammonium compounds such as tetramethylammonium hydroxide and tetraethylammonium hydroxide.

Preferred catalysts include tetramethylammonium hydroxide, sodium hydroxide, and mixtures thereof.

Carbonic acid diesters are of the general formula, $R_2(CO_3)$ wherein R is an alkyl or aryl group. Typical examples of carbonic acid diesters include, but are not limited to, diphenyl carbonate, ditolyl carbonate, bis(chlorophenyl) carbonate, m-cresyl carbonate, dinaphthyl carbonate, diethyl carbonate, dimethyl carbonate, dibutyl carbonate, dicyclohexyl carbonate and combinations thereof. The carbonic diester most typically used is diphenyl carbonate.

In order to form polyester carbonates, two moles of the carbonic acid diester are needed for each mole of diacid and one mole of the carbonic acid diester is needed for each mole of aromatic dihydroxy compound. Catalyst is present in a range between about $10^{-8}$ moles and about $10^{-3}$ moles to moles of aromatic dihydroxy compound. In another embodiment, the catalyst is present in a range between about $10^{-7}$ moles and about $10^{-5}$ moles to moles of aromatic dihydroxy compound.

Reaction occurs in either batch mode, continuous mode or semi-continuous mode. With a batch mode reaction, for instance, all of the components are combined and reacted until most of the reactants are consumed. In order to proceed, the reaction has to be stopped and additional reactant added. With continuous or semi-continuous conditions, the reaction does not necessarily have to be stopped in order to add more reactants.

Following completion of the melt condensation polymerization process, the polyester carbonate may be recovered and isolated by conventional procedures. These may include, for example, at least one step of anti-solvent precipitation, washing, drying and devolatilization-pelletization via extrusion.

In one embodiment of the invention, the direct reaction of the diacid with the carbonic acid diester and catalyst occurs in the presence of at least one aromatic dihydroxy compound. The reaction occurs typically at a temperature in a range between about 180° C. and about 270° C. Commonly, the reaction is carried out at a temperature in a range between about 220° C. and about 260° C. More commonly, the reaction is carried out at a temperature in a range between about 230° C. and about 250° C. The reaction is typically carried out at a pressure in a range between about atmospheric pressure and 200 torr. Once there is substantially complete conversion of the carbonic acid diester and diacid to a carboxylic diester, the reaction temperature is increased and pressure is decreased to facilitate a reaction of the diester and the aromatic dihydroxy compound. The temperature is increased the reaction chamber in a range between about 250° C. and about 320° C. and more commonly, in a range between about 270° C. and about 300° C. The pressure is decreased in the reaction chamber in a range between about 50 torr and about 0.01 torr. At the increased temperature and decreased pressure, distillation of byproducts, such as phenol, occurs.

In a second embodiment of the invention, the direct reaction of the diacid with the carbonic acid diester and catalyst occurs in the presence of polycarbonate oligomers, preferably low molecular weight polycarbonate oligomers. Polycarbonate oligomers are typically synthesized from the melt condensation polymerization of at least one aromatic dihydroxy compound, carbonic acid diester, and catalyst. The polycarbonate oligomers formed preferably have at least one hydroxy terminated end group and alternatively, have both chain ends terminated with a hydroxy end group. The molecular weight range polycarbonate oligomers that are formed depends on the pressure and temperature conditions in the reaction chamber. Typically, "oligomers" as used herein refers to low molecular weight polycarbonate wherein the number average molecular weight is in a range between about 2000 grams per mole and about 6000 grams per mole.

Polycarbonates useful in the compositions of the invention include those comprising structural units of the formula VIII:

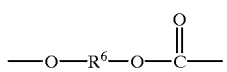
(VIII)

wherein at least about 50 percent of the total number of $R^6$ groups are aromatic organic radicals and the balance thereof are aliphatic, alicyclic, or aromatic radicals. Suitable $R^6$ radicals include m-phenylene, p-phenylene, 4,4'-biphenylene, 4,4'-bi(3,5-dimethyl)-phenylene, 2,2-bis(4-phenylene)propane, 1,1'-bis(4-phenylene)-3,3,5-trimethylcyclohexane, and similar radicals such as those which correspond to the dihydroxy-substituted aromatic hydrocarbons disclosed by name or formula (generic or specific) in U.S. Pat. No. 4,217,438.

More preferably, $R^6$ is an aromatic organic radical and still more preferably a radical of the formula IX:

$$—B^1—Z^1—B^2—$$ (IX)

wherein each $B^1$ and $B^2$ is a monocyclic divalent aryl radical and $Z^1$, is a bridging radical in which one or two atoms separate $B^1$ and $B^2$. For example, $B^1$ and $B^2$ typically represent unsubstituted phenylene or substituted derivatives thereof. The bridging radical $Z^1$ is most often a hydrocarbon group and particularly a saturated group such as methylene, cyclohexylidene, 3,3,5-trimethylcyclohexylidene, or isopropylidene. The most preferred polycarbonates are bisphenol A polycarbonates, in which each of $B^1$ and $B^2$ is p-phenylene and $Z^1$ is isopropylidene. Preferably, the weight average molecular weight of the initial polycarbonate ranges from about 5,000 to about 100,000; more preferably from about 10,000 to about 65,000, still more preferably from about 16,000 to about 40,000, and most preferably from about 20,000 to about 36,000. Suitable polycarbonates may be made using any process known in the art, including interfacial, solution, solid state, or melt processes.

Once the polycarbonate oligomers have been formed, carbonic acid diester, catalyst and diacid are added to the polycarbonate oligomers. The reaction of the carbonic acid diester, catalyst and diacid occurs in the presence of the polycarbonate oligomers at a temperature in a range between about 180° C. and about 270° C. Commonly, the reaction is carried out at a temperature in a range between about 220° C. and about 260° C. More commonly, the reaction is carried out at a temperature in a range between about 230° C. and about 250° C. The pressure in the reaction vessel is in a range between atmospheric pressure and about 200 torr. Once there is substantially complete conversion of the carbonic acid diester and diacid to a diester, the reaction temperature is increased and the pressure is decreased to facilitate a reaction of the diester and the polycarbonate oligomers. The temperature is increased in the reaction chamber in a range between about 250° C. and about 320° C. and more commonly, in a range between about 270° C. and about 300° C. The final pressure is decreased in the reaction chamber in a range between about 50 torr and about 0.01 torr. At the increased temperature and decreased pressure, distillation of byproducts, such as phenol, occurs.

The direct reaction of the carbonic acid diester, catalyst and diacid in he presence of aromatic dihydroxy compounds and alternatively, in the presence of polycarbonate oligomers has been found to be an efficient and effective method to fully incorporate diacids into polycarbonate to form polyester carbonates without the need for a pre-reactor. In addition, the chemical components do not necessarily need to be added in a specific sequence in order to incorporate the diacid into the resulting polyester carbonate.

Polyester carbonates obtained by the present invention can be used in a wide variety of applications for example, for optical data storage components such as compact discs and cartridges. Polyester carbonates may also be used for indoor and outdoor lighting lenses, housings and covers. Polyester carbonates are also used in computers and in the telecommunication industry for cases. In addition, polyester carbonates are used for containers, optical lenses and eyewear.

In order that those skilled in the art will be better able to practice the invention, the following examples are given by way of illustration and not by way of limitation.

EXAMPLE 1

Polymerization of Dodecanedioic Acid with 2,2-bis (4-hydroxyphenyl)propane and Diphenyl Carbonate A glass tube (3.8 centimeters by 3.0 centimeters) was pre-treated with a 3 molar hydrochloric acid solution and rinsed in deionized water. Diphenyl carbonate (46.303 grams), dodecanedioic acid (4.073 grams), 2,2-bis(4-hydroxyphenyl)propane (40.821 grams), sodium hydroxide (98.25 microliters of a 1 millimolar solution) and tetramethylammonium hydroxide (218.8 microliters of a 0.22 molar solution) were added to the pre-treated glass tube. A stirrer was added and the tube was fitted to a melt reaction system. The tube was evacuated, refilled with nitrogen gas three times, and heated to 240° C. After the contents were allowed to melt, the mixture was stirred at 60 rpm. Aliquots were removed every 15 minutes for analysis by proton nuclear magnetic resonance (NMR) spectroscopy. After 45 minutes, there was complete conversion of the dodecanedioic acid to a diaryl diester. The temperature was raised to 270° C. and the pressure was reduced to 170 torr. Phenol was slowly distilled off over the next 90 minutes while the pressure was gradually reduced to 80 torr and the temperature raised to 270° C. The temperature was then raised to 300° C. and the pressure reduced to less than 1 torr. The melt was held at these conditions for 90 minutes, then vented to atmospheric pressure with nitrogen gas and removed from the reactor as a melt.

The resulting polyester carbonate formed had a $T_g$ of 124° C. as measured by differential scanning calorimetry (DSC), a molecular weight of 69,900 as measured by gel permeation chromatography (GPC) in chloroform against a polystyrene standard and substantially complete incorporation of the dodecanedioic acid as determined by proton nuclear magnetic spectroscopy.

EXAMPLE 2

Polymerization of Dodecanedioic Acid with 2,2-bis (4-hydroxyphenyl)propane, 2,2-bis(4-hydroxy-3-methylphenyl)propane and Diphenyl Carbonate A glass tube (3.8 centimeter by 3.0 centimeter) was pre-treated with a 3 molar hydrochloric acid solution and rinsed in deionized water. Diphenyl carbonate (43.755 grams), dodecanedioic acid (2.412 grams), 2,2-bis(4-hydroxyphenyl)propane (18.731 grams), 2,2-bis(4-hydroxy-3-methylphenyl)-propane (24.320 grams), sodium hydroxide (87.29 microliters of a 1 millimolar solution) and tetramethylammonium hydroxide (194.4 microliters of a 0.22 molar solution) were added to the pre-treated glass tube. The tube was evacuated, refilled with nitrogen gas three times and heated to 240° C. After the contents were allowed to melt, the mixture was stirred at 60 rpm. After 45 minutes, there was complete conversion of the dodecanedioic acid to the diaryl diester by NMR analysis. The temperature was raised to 270° C. and the pressure was reduced to 170 torr. Phenol was slowly distilled off over the next 80 minutes while the pressure was gradually reduced to 80 torr and the temperature aised to 270° C. The temperature was then raised to 300° C. and the pressure reduced to less than 1 torr. The melt was held at these conditions for 90 minutes then vented to atmospheric pressure with nitrogen gas and removed from the reactor as a melt.

The resulting polyester carbonate formed had a $T_g$ of 134° C. as measured by differential scanning calorimetry (DSC), a molecular weight of 89,700 as measured by gel permeation chromatography (GPC) in chloroform against a polystyrene standard and substantially complete incorporation of dodecanedioic acid as determined by proton nuclear magnetic spectroscopy.

EXAMPLE 3

Direct Polymerization of C-19 Diacid with Polycarbonate Oligomers and Diphenyl Carbonate A glass tube (2.5 centimeters by 20 centimeters) was pre-treated with 3M hydrochloric acid solution and rinsed in deionized water. Diphenyl carbonate (4.47 grams), C-19 diacid (3.26 grams), polycarbonate oligomers wherein the molecular weight was about 5000 (46.48 grams), sodium hydroxide (4.97 microliters of a 1 millimolar solution), and tetramethylammonium hydroxide (214.6 microliters of a 0.22 molar solution) were added to the pre-treated glass tube. A magnetic stir-bar was added to the glass tube and the tube was fitted to a melt reaction system. The tube was evacuated, refilled with nitrogen gas three times, and heated to 240° C. in a salt bath. After the contents were allowed to melt, the mixture was stirred at 60 rpm. After 120 minutes, there was complete conversion of the C-19 diacid to the diaryl diester by NMR analysis. The temperature was raised to 270° C. and the pressure was reduced to 300 torr. Phenol was slowly distilled off over the next 80 minutes while the pressure was gradually reduced to 60 torr and the temperature raised to 270° C. The temperature was then raised to 300° C. and the pressure reduced to less than 1 torr. The melt was held at these conditions for 60 minutes, then vented to atmospheric pressure with nitrogen gas and removed from the reactor as a melt.

The resulting polyester carbonate formed had a $T_g$ of 128° C. as measured by differential scanning calorimetry (DSC), a molecular weight of 41,700 as measured by gel permeation chromatography (GPC) in chloroform against a polystyrene standard and substantially complete incorporation of the C-19 diacid as determined by proton nuclear magnetic spectroscopy.

EXAMPLE 4

Direct Polymerization of Dodecanedioic Acid with Polycarbonate Oligomers, 2,2-bis(4-hydroxy-3-methylphenyl)propane and Diphenyl Carbonate A glass tube (2.5 centimeters by 20 centimeter) was pre-treated with 3M hydrochloric acid solution and rinsed in deionized water. Diphenyl carbonate (5.500 grams), dodecanedioic acid (0.603 grams), polycarbonate oligomers wherein the molecular weight was about 5000 (5.216 grams), 2,2-bis(4-hydroxy-3-methylphenyl)-propane (6.080 grams), sodium hydroxide (11.57 microliters of a 1 millimolar solution), and tetramethylammonium hydroxide (48.60 microliters of a 0.22 molar solution) were added to the pre-treated glass tube. A stirrer was added to the glass tube and the tube was fitted to a melt reaction system. The tube was evacuated, refilled with nitrogen gas three times, and heated to 240° C. in a salt bath. After the contents were allowed to melt, the mixture was stirred at 60 rpm. After 120 minutes, there was complete conversion of the dodecanedioic acid to the diaryl diester by NMR analysis. The temperature was raised to 270° C. and the pressure was reduced to 300 torr. Phenol was slowly distilled off over the next 80 minutes while the pressure was gradually reduced to 60 torr and the temperature raised to 270° C. The temperature was then raised to 300° C. and the pressure reduced to less than 1 torr. The melt was held at these conditions for 60 minutes, then vented to atmospheric pressure with nitrogen gas and removed from the reactor as a melt.

The resulting polyester carbonate formed had a $T_g$ of 128° C. as measured by differential scanning calorimetry (DSC), a molecular weight of 55,200 as measured by gel permeation chromatography (GPC) in chloroform against a polystyrene standard and substantially complete incorporation of the dodecanedioic acid as determined by proton nuclear magnetic spectroscopy.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A melt condensation polymerization process for preparing polyester carbonates wherein the process comprises reacting directly a carbonic acid diester with a catalyst and a diacid in the presence of at least one aromatic dihydroxy compound.

2. The process in accordance with claim 1, wherein the diacid is selected from the group consisting of adipic acid, sebacic acid, dodecanedioic acid, C-19 dimer diacid, C-36 dimer diacid, terephthalic acid, isophthalic acid and combinations thereof.

3. The process in accordance with claim 2, wherein the diacid comprises dodecanedioic acid.

4. The process in accordance with claim 1, wherein the aromatic dihydroxy compound comprises 2,2-bis(4-hydroxyphenyl)propane.

5. The process in accordance with claim 1, wherein the catalyst comprises a quaternary ammonium compound, an alkali metal compound, an alkaline earth metal compound, or combinations thereof.

6. The process in accordance with claim 1, wherein the catalyst is tetramethylammonium hydroxide, sodium hydroxide or mixtures thereof.

7. The process in accordance with claim 1, wherein the carbonic acid diester is diphenyl carbonate.

8. The process in accordance with claim 1, wherein the aromatic dihydroxy compound is present in a ratio to carbonic acid diester of 1:1.

9. The process in accordance with claim 1, wherein the diacid is present in a ratio to carbonic acid diester of 1:2.

10. The process in accordance with claim 1, wherein the catalyst is present in a ratio between about $10^{-8}$ moles and about $10^{-3}$ moles to moles of aromatic dihydroxy compound.

11. The process in accordance with claim 10, wherein the catalyst is present in a ratio between about $10^{-7}$ moles and about $10^{-5}$ moles to moles of aromatic dihydroxy compound.

12. The process in accordance with claim 1, wherein the reaction occurs in batch mode.

13. The process in accordance with claim 1, wherein the reaction occurs in continuous mode.

14. A polyester carbonate made by the process of claim 1.

15. A melt condensation polymerization process for preparing polyester carbonates wherein the process comprises reacting directly a carbonic acid diester with a catalyst and a diacid in the presence of polycarbonate oligomers.

16. The process in accordance with claim 15, wherein the diacid is selected from the group consisting of adipic acid, sebacic acid, dodecanedioic acid, C-19 dimer diacid, C-36 dimer diacid, terephthalic acid, isophthalic acid and combinations thereof.

17. The process in accordance with claim 15, wherein the diacid comprises dodecanedioic acid.

18. The process in accordance with claim 15, wherein the carbonic acid diester comprises diphenyl carbonate.

19. The process in accordance with claim 15, wherein the catalyst comprises tetramethyl ammonium hydroxide, sodium hydroxide and mixtures thereof.

20. The process in accordance with claim 15, wherein the polycarbonate oligomer comprises an oligomer of 2,2-bis (4-hydroxyphenyl)propane.

21. The process in accordance with claim 15, wherein the aromatic dihydroxy compound is present in a ratio to carbonic acid diester of 1:1.

22. The process in accordance with claim 15, wherein the diacid is present in a ratio to carbonic acid diester of 1:2.

23. The process in accordance with claim 15, wherein the catalyst is present in a ratio between about $10^{-8}$ moles and about $10^{-3}$ moles to moles of aromatic dihydroxy compound.

24. The process in accordance with claim 23, wherein the catalyst is present in a ratio between about $10^{-7}$ moles and about $10^{-5}$ moles to moles of aromatic dihydroxy compound.

25. The process in accordance with claim 15, wherein the reaction occurs in a batch mode reactor.

26. The process in accordance with claim 15, wherein the reaction occurs in continuous mode.

27. A polyester carbonate made by the process of claim 15.

28. A melt condensation polymerization process for preparing polyester carbonates wherein the process comprises reacting directly diphenyl carbonate with tetramethylammonium hydroxide, sodium hydroxide and dodecanedioic acid in the presence of 2,2-bis(4-hydroxyphenyl)propane.

29. A polyester carbonate made by the process of claim 28.

30. A melt condensation polymerization process for preparing polyester carbonates wherein the process comprises reacting directly diphenyl carbonate with tetramethylammonium hydroxide, sodium hydroxide and dodecanedioic acid in the presence of 2,2-bis(4-hydroxyphenyl)propane oligomers.

31. A polyester carbonate made by the process of claim 30.

* * * * *